Patented June 10, 1930

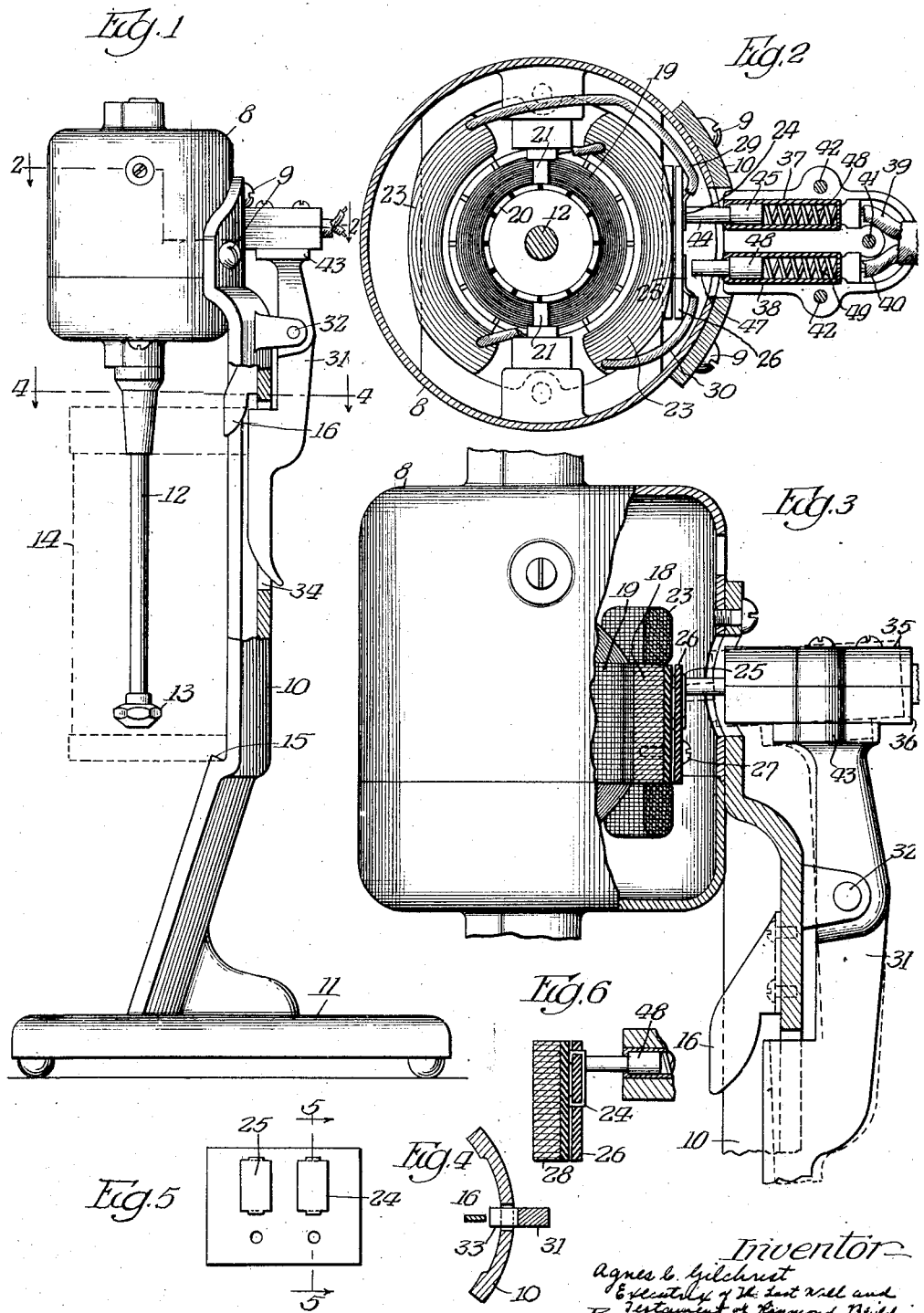

1,762,391

UNITED STATES PATENT OFFICE

RAYMOND B. GILCHRIST, DECEASED, LATE OF NEWARK, NEW JERSEY, BY AGNES C. GILCHRIST, EXECUTRIX, OF NEW YORK, N. Y., ASSIGNOR TO THE GILCHRIST COMPANY, OF NEWARK, NEW JERSEY, A CORPORATION OF NEW JERSEY

DRINK MIXER

Original application filed February 8, 1923, Serial No. 617,661, and in Canada February 16, 1926. Divided and this application filed January 28, 1929. Serial No. 335,639.

The invention relates to electric drink mixers.

In the operation of drink mixers which include an electric motor, the service is interrupted whenever the motor becomes inoperative. The object of the present invention is to provide an improved electric drink mixer which is constructed so that the motor may be removed from its support for replacement or repair, without the necessity of disconnecting or cutting in of the electrical connections for supplying current to the motor. This object is attained by providing contacts in or removable with the motor as an entity, which are adapted to cooperate with a switch device which is adapted to contact with, but is otherwise disconnected from, the contacts, so that the motor and its contents may be removed as a unit, without cutting or disconnecting any of the wiring necessary to supply current to the motor. As a result, the user of a mixer, when the motor becomes inoperative or requires repairs, can readily remove it, and replace it with another, so that there will be no interruption in the service of the mixer. It becomes feasible to keep available a spare unit for instantaneous replacement of the defective one, whenever it is necessary, or the user can procure and readily substitute a spare motor unit while the one removed is being repaired. This application is a division of application No. 617,661, filed by Raymond B. Gilchrist Feb. 8, 1923.

The invention consists in the several novel features hereinafter set forth and more particularly defined by claims at the conclusion hereof.

In the drawings: Fig. 1 is a side elevation of a drink mixer embodying the invention, parts being shown in elevation. Fig. 2 is a horizontal section on line 2—2 of Fig. 1. Fig. 3 is a longitudinal section through a portion of the motor and its support. Fig. 4 is a section on line 4—4 of Fig. 1. Fig. 5 is a detail of the insulation carrying the contact plates in the motor. Fig. 6 is a section on line 6—6 of Fig. 2.

The invention is exemplified in an automatic one-hand type of mixer exhibited in Patent No. 1,542,197, in which the casing 8 of an electric motor is secured by screws 9 to the upper end of a supporting standard 10 which is fixed on a base 11. A shaft 12 is fixed to, and depends from, the rotor of the motor and carries, at its lower end, an agitator 13, which is adapted to mix the contents of a receptacle 14. This receptacle is removably held in operative position around the agitator by an arcuate rest or support 15 for the bottom of the receptacle, and a hook 16 adapted to engage the inner margin of the receptacle.

There is sufficient clearance below and around the agitator to permit the operator to manipulate the receptacle upwardly along the standard 10, so that the rim of the receptacle will be held by hook 16 and the bottom by the rest 15, as more fully set forth in the aforesaid patent. The motor casing carries bearings for the shaft 12, and is formed of upper and lower sections, as well understood in the art. This casing is secured to the upper end of standard 10 by screws 9, so that by removal of the screws, the entire motor, with shaft 12 and agitator 13, can be removed. The motor comprises a laminated field 18 which is fixedly secured in the motor casing, an armature 19 on the shaft 12, a commutator 20 rotating with the armature, stationary brushes 21, mounted in the upper portion of the case, and suitable field windings 23. These parts may be of any suitable construction, as well understood in the art. Contact plates 24 and 25 are clenched to a plate 26 of insulating material. Screws 27 extend through plate 26 and into the field 18. An insulating strip 28 is interposed between plate 6 and the laminated field to insulate the field from contacts 24, 25. Plates 24, 25 are connected by conductors 29 and 30 respectively, to the field windings which are, in turn, connected to the brushes in manner well understood in the art. Contacts 24 and 25 are mounted in the motor casing, so that they will be removable with the motor as an entity, and so that the motor will be removed without disconnecting any wiring.

A lever 31 is pivoted, at 32, to standard 10, and has a portion 33 extending through a slot 34 in the standard. Said portion 33 is positioned in the path of movement of the receptacle 14, so that it will be shifted and released by placement of the receptacle into the holding device, and its removal therefrom. Placement of the receptacle into operative position. Shift of the lever by the receptacle automatically controls the operation of the motor through a switch which is mounted at the upper end of the lever, and is adapted to establish electrical connections to supply current to the motor. This switch consists of a box of insulating material formed of sections 35 and 36 containing a pair of sockets 37 and 38, to which are respectively connected conductors 39 and 40 from the current supply. These sockets are fixedly held between the box sections, which are secured together by a screw 41 and screws 42 which pass through the sections and secure them conjointly to the upper end of the lever 31 which is provided with a lug 43 for this purpose. A contact pin 44, having a head 45 which is slidable in socket 37, is acted upon by a spring 46 and is adapted to remain in constant contact with contact-plate 24. A pin 47 with a head 48 is slidable in socket 38, and is acted upon by a sprnig 49 to yieldingly press said pin outwardly. Pin 47 is adapted to engage contact plate 25 to complete the circuit for the operation of the motor, and is normally separated therefrom to keep the circuit interrupted until lever 31 is shifted by the receptacle.

The operation will be as follows: When the receptacle 14 is placed onto rest 15 and into hook 16, it will engage lever 31 and swing the switch-box inwardly to cause spring-pressed contact pin 47 to engage contact-plate 25 in the motor so that a circuit will be completed as follows: Conductor 40, socket 38, pin 47, plate 25, conductor 30, and the windings of the motor, conductor 29, plate 24, contact pin 44, socket 37, and conductor 39. Upon removal of the receptacle 14, spring 46 will restore lever 31 to its normal position and cause the circuit to be interrupted between contact-plate 25 and pin 47. When the motor is to be repaired, the user can readily remove it as an entity by removing screws 9 without any change in the wiring.

The invention exemplifies a motor unit for drink mixers which is provided with contacts for engagement with the members of a switch for controlling the operation of the motor which is mounted on the standard, so that when a repair or replacement is necessary, the motor may be removed as a unit without the necessity of disturbing the electrical conductors for supplying current to the motor.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. A replacement unit for drink-mixers comprising an electric motor provided with a casing adapted to be removably secured to a drink-mixer support and to drive a downwardly extending agitator shaft, and terminal contacts fixedly held in the casing, directly connected by electric conductors to the windings of the motor and adapted for direct engagement by motor controlling switch-members on the support, which are readily operable to control the operation of the motor, the motor being adapted to be rendered completely operable by current received from the switch and through said contacts and controlled by the operation of said switch-members.

2. A replacement unit for drink-mixers comprising an electric motor provided with a casing adapted to be removably secured to a drink-mixer support and having an agitator affixed to the rotor, and terminal contacts fixedly held in the casing, directly connected by electric conductors to the windings of the motor and adapted for direct engagement by motor-controlling switch-members on the support, which are readily operable to control the operation of the motor, the motor being adapted to be rendered completely operable by current received from the switch and through said contacts, and controllable by the operation of said switch-member.

3. A replacement unit for drink-mixers comprising an electric motor provided with a casing adapted to be removably secured to a drink-mixer support, and to drive a downwardly extending agitator shaft, and terminal contacts fixedly held in the casing directly connected by electric conductors to the windings of the motor and adapted for direct engagement by motor-controlling switch-members on the support which are readily operable to control the operation of the motor, the motor being adapted to be rendered completely operable by current received from the switch and through said contacts, and controlled by the operation of said switch-members.

4. A replacement unit for drink-mixers comprising an electric motor provided with a casing adapted to be removably secured to a drink-mixer support and having an agitator affixed to the rotor, and terminal contacts fixedly held in the casing directly connected by electric conductors to the windings of the motor and adapted for direct engagement by motor-controlling switch-members on the support which are readily operable to control the operation of the motor, the motor being adapted to be rendered completely operable by current received from the switch and through said contacts and controllable by the operation of said switch-member.

AGNES C. GILCHRIST,
*Executrix of the Last Will and Testament of Raymond B. Gilchrist, Deceased.*